No. 712,641. Patented Nov. 4, 1902.
H. BILES.
HORSESHOE PAD.
(Application filed May 22, 1902.)

(No Model.)

Witnesses
A. J. Hadden
O. Pickering.

Inventor
Henry Biles
by his Attorney R. Hadden

THE NORRIS PETERS CO., PHOTO-LITHO., WASHINGTON, D. C.

UNITED STATES PATENT OFFICE.

HENRY BILES, OF EALING DEAN, ENGLAND, ASSIGNOR TO JAMES HENRY OSBORNE, OF LONDON, ENGLAND.

HORSESHOE-PAD.

SPECIFICATION forming part of Letters Patent No. 712,641, dated November 4, 1902.

Application filed May 22, 1902. Serial No. 108,589. (No model.)

*To all whom it may concern:*

Be it known that I, HENRY BILES, a subject of the King of England, residing at Ealing Dean, in the county of Middlesex, England, have invented a certain new and useful Improvement in Horseshoe-Pads, of which the following is a specification.

This invention relates to improvements in horseshoe-pads; and the object is to mitigate concussion and slipping.

Figure 1:
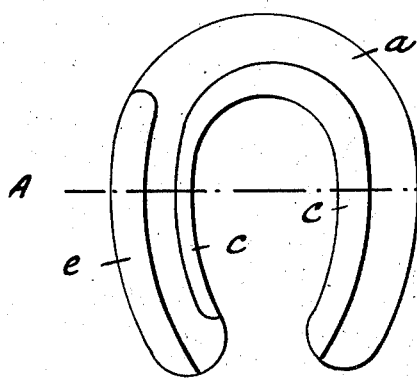
Figure 2:
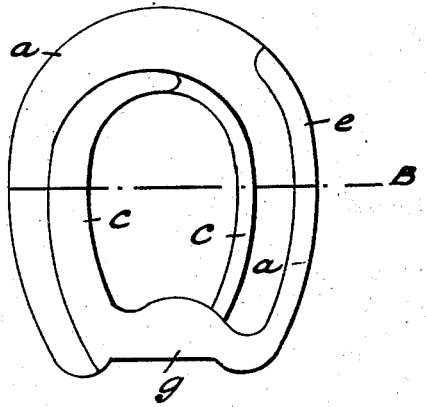
Figure 3:
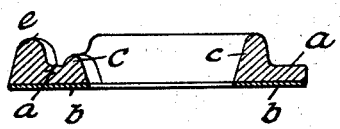
Figure 4:
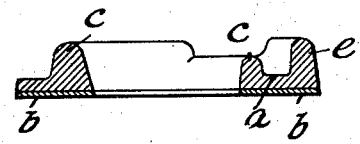
Figure 5:
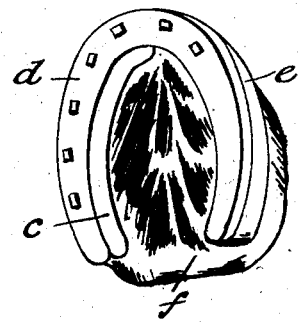
Figure 6:
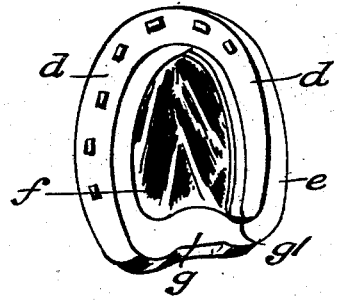

In the accompanying drawings two different forms of pads are shown in Figures 1 and 2 in plan from below. Figs. 3 and 4 are respectively sections of Figs. 1 and 2 on the line A B. Figs. 5 and 6 are plans from below showing the applications of the forms of pad shown in Figs. 1 and 2, respectively, to a hoof and shoe, Fig. 5, however, being for an opposite shoe to Fig. 1.

The improved pads are preferably made of rubber and canvas combined, but may be made of rubber, leather, canvas, or other suitable material, either singly or combined.

In the form shown in Fig. 1 the pad consists simply of an inner sole or flange $a$, of rubber, having a covering of canvas, leather, or other suitable material $b$ bearing against the hoof $f$ and provided with a rib $c$, projecting downward through the inner edge and slightly beyond the working surface of the shoe $d$ to prevent slipping. In addition to the inner rib $c$, which is slightly reduced in thickness on one side, an outer rib $e$ is provided, so as to protect the cutting edge of the shoe on the side adjacent the other hoof, and this rib $e$ also projects slightly beyond the working face of the shoe.

Fig. 2 shows another form very similar to Fig. 1, which in addition to the inner and outer ribs $c$ and $e$ above mentioned is provided with a bar $g$ across the heel portion. This bar may be slightly curved inward, if desired, so as to cover or partly cover but not press upon the frog. This enables the animal to be pulled up quickly and easily on any surface and without strain. In using this pad a portion of one end of the shoe $d$ will have to be removed at $g'$, so as to fit within the ribs $c$ and $e$ and the bar $g$.

It is obvious from the drawings and above description that the flange or inner sole $a$, placed between the hoof and shoe, will considerably mitigate concussion, while the various projecting ribs $c\ e$ and bar $g$ form an effective means against slipping and cutting.

I declare that what I claim is—

1. A horseshoe-pad open in the center having a flange or inner sole adapted to bear against the hoof, an inner rib passing through the interior of the shoe, and a rib surrounding the outside edge of the shoe on one side, both said ribs projecting from the flange to slightly beyond the working surface of the shoe, substantially as described.

2. A horseshoe-pad open in the center having a flange or inner sole adapted to bear against the hoof, an inner rib passing through the interior of the shoe, a rib surrounding the outside edge of the shoe on one side, and a cross-bar connecting the heel portions of the pad, both the ribs aforesaid projecting from the flange to slightly beyond the working surface of the shoe, substantially as described.

In witness whereof I have signed this specification in the presence of two witnesses.

HENRY BILES.

Witnesses:
A. J. HADDAN,
E. M. MOORE.